US008392512B2

(12) United States Patent
Piccinini et al.

(10) Patent No.: US 8,392,512 B2
(45) Date of Patent: *Mar. 5, 2013

(54) METHOD AND SYSTEM FOR MANAGING A SHARED ELECTRONIC MAIL ACCOUNT

(75) Inventors: Sandro Piccinini, Rome (IT); Marco Secchi, Rome (IT); Antonio Secomandi, Milan (IT); Francesco Lecciso, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/054,499

(22) Filed: Mar. 25, 2008

(65) Prior Publication Data
US 2008/0177850 A1 Jul. 24, 2008

Related U.S. Application Data (63) Continuation of application No. 11/872,784, filed on Oct. 16, 2007, now Pat. No. 7,797,388.

(30) Foreign Application Priority Data

Nov. 20, 2006 (EP) .................................. 06124366

(51) Int. Cl.
*G06F 15/16* (2006.01)
*G06F 17/00* (2006.01)
(52) U.S. Cl. ........................ 709/206; 715/230
(58) Field of Classification Search .................. 709/206
See application file for complete search history.

(56) References Cited

U.S. PATENT DOCUMENTS

| | | | |
|---|---|---|---|
| 6,185,606 B1* | 2/2001 | Bereiter | 709/206 |
| 6,636,585 B2* | 10/2003 | Salzberg et al. | 379/22 |
| 6,640,230 B1 | 10/2003 | Alexander et al. | |
| 6,643,687 B1* | 11/2003 | Dickie et al. | 709/206 |
| 7,058,683 B1* | 6/2006 | Belissent et al. | 709/206 |
| 7,689,563 B1* | 3/2010 | Jacobson | 709/209 |
| 2004/0039630 A1* | 2/2004 | Begole et al. | 705/11 |
| 2004/0109544 A1* | 6/2004 | Didcock et al. | 379/88.22 |
| 2004/0237045 A1* | 11/2004 | Meltzer | 715/530 |
| 2004/0243701 A1* | 12/2004 | Hardwicke et al. | 709/224 |
| 2005/0080861 A1* | 4/2005 | Daniell et al. | 709/206 |
| 2005/0183021 A1* | 8/2005 | Allen et al. | 715/747 |
| 2005/0198170 A1* | 9/2005 | LeMay et al. | 709/206 |
| 2006/0129602 A1* | 6/2006 | Witriol et al. | 707/104.1 |

(Continued)

FOREIGN PATENT DOCUMENTS

| | | |
|---|---|---|
| EP | 0371605 A2 | 10/1989 |
| JP | 08065335 A | 3/1996 |

(Continued)

OTHER PUBLICATIONS

European Search Report for EP06124366.3-2416 Dated Feb. 5, 2007.

(Continued)

*Primary Examiner* — Krisna Lim
*Assistant Examiner* — Margishi Desai
(74) *Attorney, Agent, or Firm* — Cantor Colburn LLP (57) ABSTRACT

A method of managing a shared electronic mail account co-owned by at least two owners includes intercepting electronic mail account configuration settings received from the at least two owners; combining the intercepted electronic mail account configuration settings based on a shared electronic mail account profile so as to generate shared e-mail account configuration settings; and applying the shared e-mail account configuration settings so as to affect the operation of the shared electronic mail account.

14 Claims, 4 Drawing Sheets

U.S. PATENT DOCUMENTS

| | | | | |
|---|---|---|---|---|
| 2006/0143276 | A1* | 6/2006 | Phillips et al. | 709/206 |
| 2006/0143278 | A1* | 6/2006 | Bauchot et al. | 709/206 |
| 2006/0174118 | A1* | 8/2006 | Gaucas et al. | 713/170 |
| 2006/0248155 | A1* | 11/2006 | Bondarenko et al. | 709/206 |
| 2007/0124586 | A1* | 5/2007 | Ochi | 713/168 |
| 2007/0192418 | A1* | 8/2007 | Adams et al. | 709/206 |
| 2007/0198639 | A1* | 8/2007 | Litwin et al. | 709/206 |
| 2008/0043936 | A1* | 2/2008 | Liebermann | 379/52 |
| 2008/0195953 | A1* | 8/2008 | Sen | 715/744 |
| 2008/0201174 | A1* | 8/2008 | Ramasubramanian et al. | 705/3 |
| 2008/0235334 | A1* | 9/2008 | Gupta et al. | 709/206 |
| 2008/0263101 | A1* | 10/2008 | Hara | 707/200 |
| 2009/0259726 | A1* | 10/2009 | Jordan, Jr. | 709/206 |
| 2010/0077051 | A1* | 3/2010 | Daniell et al. | 709/206 |

FOREIGN PATENT DOCUMENTS

| | | |
|---|---|---|
| JP | 09307584 | 11/1997 |
| JP | 2002084370 | 3/2002 |
| JP | 2002111874 | 4/2002 |
| JP | 2003186802 | 7/2003 |
| JP | 2003223404 | 8/2003 |
| JP | 2004021623 | 1/2004 |

OTHER PUBLICATIONS

J. Klesin, Editor; Simple Mail Transfer Protocol; Apr. 2001; pp. 1-62.

J. Postel; Simple Mail Transfer Protocol; Aug. 1982; pp. 1-46.

* cited by examiner

METHOD AND SYSTEM FOR MANAGING A SHARED ELECTRONIC MAIL ACCOUNT

CROSS REFERENCE TO RELATED APPLICATIONS

This application is a continuation application of U.S. Ser. No. 11/872,784 filed Oct. 16, 2007, which claims priority to European Patent Application No. 06124366.3, filed 20 Nov. 2006, and all the benefits accruing therefrom under 35 U.S.C. §119, the contents of which in its entirety are herein incorporated by reference.

BACKGROUND

1. Technical Field

The present invention generally relates to the field of electronic data processing and data communications systems, and to data processing system networks (referred to as computer networks hereinafter) supporting electronic messaging (hereinafter referred to as electronic mail or "e-mail" for short) systems. More specifically, the invention concerns improvements to shared e-mail systems.

2. Background Art

With the growth of computer networks, e-mail has become an extremely fast, economic, easy to use and thus extremely popular and pervasive interpersonal communication means, for both private and professional purposes. In particular, thanks to the impressive diffusion of the Internet in the past fifteen years, Internet Protocol (IP) e-mail nowadays provides a standard communication mechanism for millions of computer users. Nomadicity and the advent of wireless networks, together with the addition of packet-switched capabilities to mobile telephony networks have further increased the diffusion of e-mail as a communication resource.

Generally speaking, e-mail systems are based on the client-server paradigm. By means of any one of the several, commercially available e-mail client software tools (e-mail clients), designed to be installed and executed on personal computers, workstations, portable computers, smart mobile phones, such as IBM Lotus Notes, Microsoft Outlook or Outlook Express, Eudora, Mozilla Thunderbird, just to cite few examples, the management of e-mail messages is a rather simple and user-friendly task.

Most commonly, users who wish to take advantage of e-mail systems creates their own e-mail accounts at an e-mail service provider, like the e-mail server of their Internet access provider, or the e-mail server of the data processing infrastructure of their employer.

However, there are cases in which a single and same e-mail account is shared, owned by two or more, possibly several users; the e-mail account in thus referred to as a "shared e-mail account" (shared e-mail systems are sometime also denoted "task IDs", when they are intended for a specific task, like in the case of ticketing systems).

The use of e-mail has become so wide and popular, that shared e-mail systems are for example commonly set up by companies or agencies for providing a single, unique interface to help desks, customer care or customer support teams; by sending an e-mail message to the single e-mail account of the support team, a user actually submits his/her request to an entire team of people, not merely to a single person; all the persons of the team have access to the mailbox of the shared e-mail account, and thus the customer's request may be taken care of by the member of the support team that has a lower workload, or that is more experienced in that field, or is physically closer to the location of the user (if for example resolution of the customer's problem requires visiting the premises of the latter).

Present e-mail systems are quite flexible, because they allow customization at several levels. For example, interacting with the e-mail server through his/her e-mail client, or through a web interface, a user being the owner of an e-mail account can properly configure, according to his/her needs and/or wishes, the e-mail account, for example setting if and when e-mail messages can be deleted from the mailbox, setting, as a default or for selected messages only, a request for receipt confirmation to be presented to the recipients when the latter display the messages, setting auto-reply messages, useful for example to inform other persons, sending e-mail messages thereto, that the user is not/will not be able to read (and respond to) the received messages, because on holiday or on business trip or absent for any reason.

SUMMARY

The foregoing discussed drawbacks and deficiencies of the prior art are overcome or alleviated, in an exemplary embodiment, by a method of managing a shared electronic mail account co-owned by at least two owners, the method including intercepting electronic mail account configuration settings received from the at least two owners; combining the intercepted electronic mail account configuration settings based on a shared electronic mail account profile so as to generate shared e-mail account configuration settings; and applying the shared e-mail account configuration settings so as to affect the operation of the shared electronic mail account.

In another embodiment, a system for managing a shared electronic mail account co-owned by at least two owners includes a shared mail transfer agent (MTA) configured to intercept electronic mail account configuration settings received from the at least two owners; and a master mail user agent (MUA) configured to combine the intercepted electronic mail account configuration settings based on a shared electronic mail account profile, so as to generate shared e-mail account configuration settings of the shared MTA; wherein the shared e-mail account configuration settings of the shared MTA are applied by the shared MTA so as to affect the operation of the shared MTA and the shared e-mail account.

In another embodiment, a computer storage medium includes computer program code comprising computer executable instructions for causing a computer to implement a method of managing a shared electronic mail account co-owned by at least two owners, the method further including intercepting electronic mail account configuration settings received from the at least two owners; combining the intercepted electronic mail account configuration settings based on a shared electronic mail account profile so as to generate shared e-mail account configuration settings; and applying the shared e-mail account configuration settings so as to affect the operation of the shared electronic mail account.

BRIEF DESCRIPTION OF THE DRAWINGS

The features and advantages of the present invention will be made apparent by the following detailed description of an embodiment thereof, provided merely by way of non-limitative example, description that will be made in conjunction with the attached drawing sheets, wherein.

DETAILED DESCRIPTION

The Applicant has observed that shared, i.e. multiple-owner e-mail systems currently do not offer the same level of functionality and flexibility as single-owner e-mail systems.

For example, let the setting of auto-reply message be considered: currently, any member of the team of people who co-owns the shared e-mail account might, through a web interface to the e-mail server, or through the respective e-mail client, set an auto-reply message; this setting would however be applied in a rather blind way, as if that co-owner were the only owner of the shared e-mail account, irrespective of the fact that other members of the team are actually available for taking care of the messages received. In other words, the shared e-mail account configuration settings received by any of the account co-owners is applied to the shared e-mail account as a whole.

The Applicant believes that it would be desirable to improve the functionality of shared e-mail systems, so as to bring them in line with single-owner e-mail systems. This would render a shared e-mail system more effective. For example, it would be useful to be able to implement an auto-reply functionality in smarter way.

In view of the foregoing, the Applicant has tackled the problem of improving the functionality of shared e-mail systems.

Figure 1:
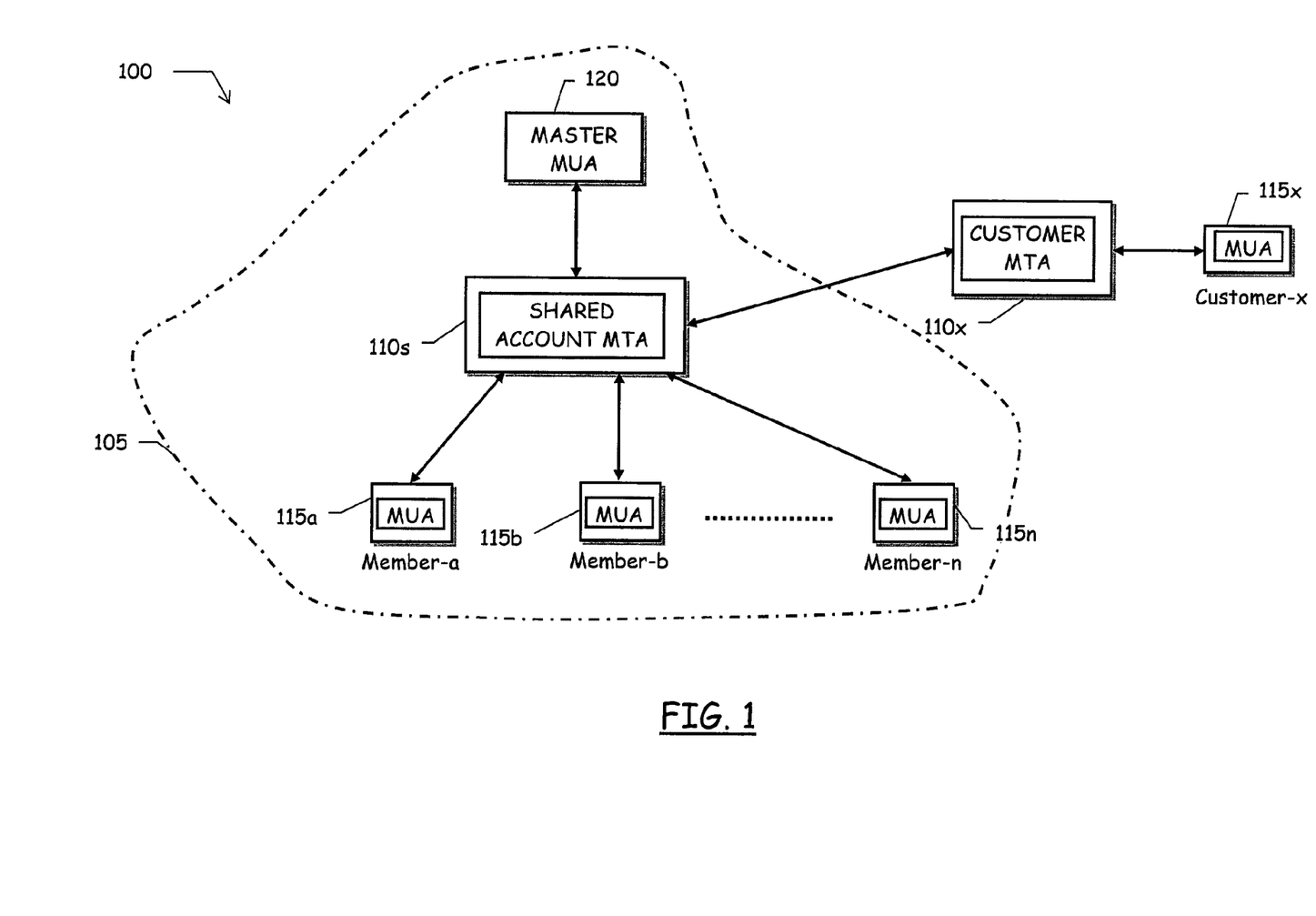
FIG. 1 is a schematic, very simplified view of an e-mail system comprising a shared-mail system according to an embodiment of the present invention.

With reference to the drawings, in FIG. 1 an e-mail system is schematically depicted, being identified as a whole by reference numeral 100. In particular, the e-mail system 100 comprises a shared, multiple-owner e-mail system, denoted as a whole by reference numeral 105. The e-mail system 100 is implemented in a distributed electronic data processing system or computer network, which may be a Local Area Network (LAN), a Metropolitan Area Network (MAN), a Wide Area Network (WAN) or a network of networks such as the Internet, it can be or include one or more wired or a wireless network, particularly but not by way of limitation a mobile telephony network like a GSM (General System for Mobile communications) network (or counterpart standards), or a UMTS (Universal Mobile Telecommunications System) network (or equivalent standards) with GPRS (General Packet Radio System) infrastructure.

In the present description, merely by way of example, it will be assumed that the shared e-mail system 105 is set up within a company or agency for providing a unique, single interface to people outside the company or agency, for example for setting up a help-desk or customer-care service. Within the company or agency, a team of two or more persons, hereinafter referred to as members Member-a, Member-b, . . . , Member-n, exists, the people of the team jointly exploiting the shared e-mail system for interacting with the customers, like the customer Customer-x.

Generally, in an e-mail system, each user who is a subscriber to the e-mail service is identified by a unique e-mail account, corresponding to a unique e-mail address; a generic e-mail address takes the known, general form:

user@ host.domain, where user is the user's account name (identifying the user's mailbox), @ is a standardized separator, and host.domain is the domain name of the host data processing apparatus managing the user's mailbox. For example, the user Customer-x may be assumed to own the e-mail account Customer-x@aaa.com. Similarly, the shared e-mail system 105 is identified as a whole by a single e-mail account or address, which hereinafter is assumed to be customer@ibm.com; all the members Member-a, Member-b, . . . , Member-n are co-owners of the shared e-mail account: for example, all of them can check the shared account mailbox, read the messages present therein, and the like.

Without entering into excessive details, known to those skilled in the art, an e-mail service is supported by the provision, within the computer network, of mail server computers (mail servers), which are host computers that manage the receipt of e-mail messages from the respective senders and delivery thereof to the proper recipients. In the shown example, reference numeral 110*x* denotes the mail server of the customer Customer-x (i.e. the mail server to which the customer Customer-x has subscribed for the e-mail service), 110*s* is the mail server of the shared e-mail system 105, i.e. the mail server managing the shared e-mail address Customer@ ibm.com (the mail server at which it is assumed that the shared e-mail service has subscribed).

An e-mail system is essentially composed by two kinds of sub-systems, cooperating with each other, namely Mail User Agents (MUAs) and Mail Transfer Agents (MTAs). MUAs are the e-mail client software tools installed and running on the computers of the users who are subscribers of and wish to exploit the e-mail service; the MUAs enable the users to manage, particularly compose, send, receive, display, archive, print etc., e-mail messages, as well as to set desired e-mail account configuration settings directly from their computers. The MTAs act as bridges between different mail servers; typically, an MTA includes a Simple Mail Transfer Protocol (SMTP) server, handling the reception of messages from the MUAs of the sender users, and the delivery/the reception of e-mail messages to/from other SMTP servers, based on the prescriptions of the SMTP protocol; the SMTP standard is described in the Request For Comments (RFC) 0821 or the evolution thereof 2821, both entitled "Simple Mail Transfer Protocol", which are incorporated herein by reference. The MTAs further include so-called Mail Delivery Agents (MDAs), which are used by the MTAs for delivering received e-mail messages to the mailbox(es) of the intended recipient(s), the mailboxes being held at the mail server. The e-mail messages received by the MTA and addressed to a generic user are at least temporarily stored by the MUA in that user' mailboxes. Typically, the MDAs include a Post Office Protocol (POP) server, e.g., a POP3 server, allowing the MUAs of the subscriber users to access the respective mailboxes from their computers.

Hereinafter, it is assumed that the customer Customer-x has a computer 115*x* where an MUA is resident, the computer 115*x* being connected or connectable (e.g., by means of an Internet connection) to the mail server 110*s* where the MTA managing the shared e-mail account Customer@ibm.com reside. The members Member-a, Member-b, . . . , Member-n have each a computer 115*a*, 155*b*, . . . , 155*n*, where respective MUAs reside, which are connected or connectable (e.g., over a LAN, a MAN, a WAN, or the Internet) to the mail server 110s of the shared mail system, where the MTA of the shared account resides.

Reference numeral 120 denotes a master MUA which is provided, according to an embodiment of the present invention, for managing the configuration settings of the shared e-mail account.

Figure 2:
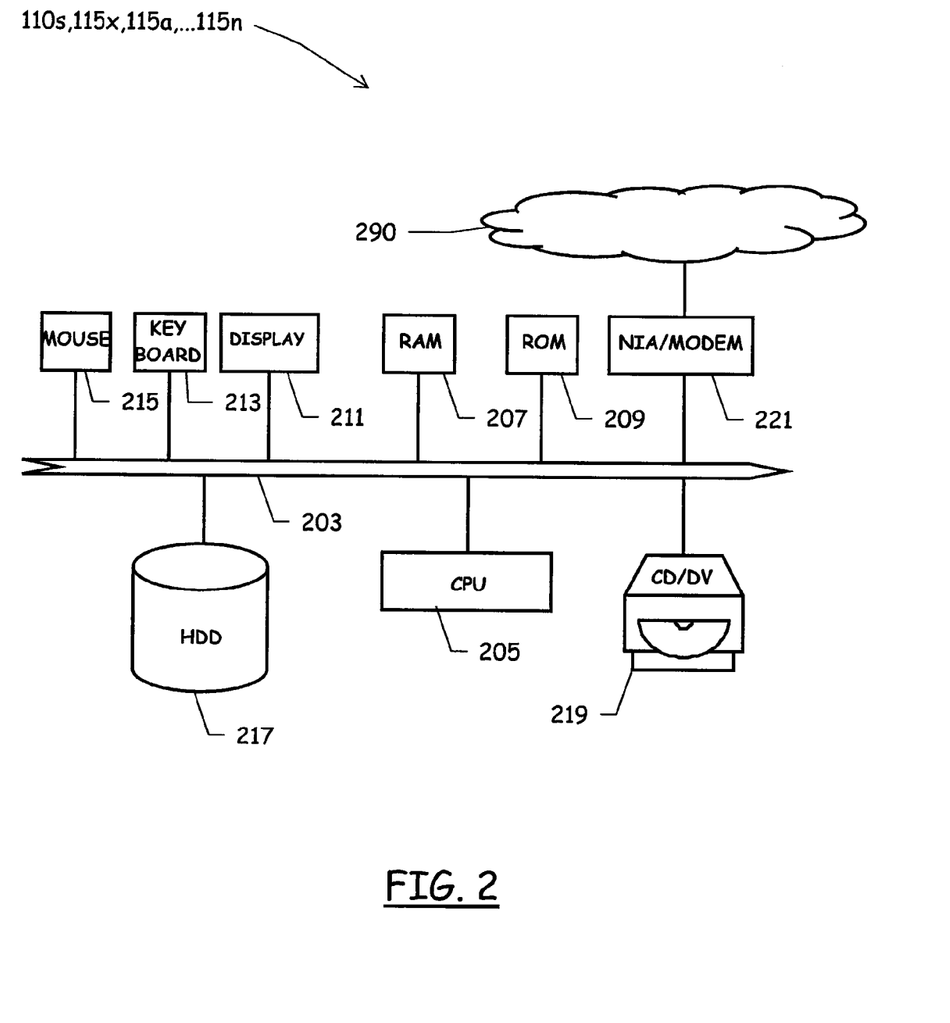
FIG. 2 schematically shows, in terms of functional blocks, the main components of a generic computer in the e-mail system of FIG. 1.

The general structure of the generic data processing apparatus or computer, like the computer 115x of the customer Customer-x, the mail server 115s and the computers 115a, 155b, ..., 155n of the co-owners of the shared e-mail account is depicted schematically in FIG. 2; several functional units connected in parallel to a data communication (e.g., a PCI) bus 203. In particular, a Central Processing Unit (CPU) 205, typically comprising a microprocessor (possibly, a plurality of cooperating microprocessors), controls the operation of the computer, a working memory 207, typically a RAM (Random Access Memory) is directly exploited by the CPU 205 for the execution of programs and for the temporary storage of data during program execution, and a Read Only Memory (ROM) 209 is used for the non-volatile storage of data, and stores for example a basic program for the bootstrap of the computer, as well as other data. The computer comprises several peripheral units, connected to the bus 203 by means of respective interfaces. Particularly, peripheral units that allow the interaction with a human user are provided, such as a display device 211 (for example a CRT, an LCD or a plasma monitor), a keyboard 213 and a pointing device 215 (for example a mouse). The computer also includes peripheral units for local mass-storage of programs (operating system, application programs) and data, such as one or more magnetic Hard-Disk Drivers (HDD), globally indicated as 217, driving magnetic hard disks, a CD-ROM/DVD driver 219, or a CD-ROM/DVD juke-box, for reading/writing CD-ROMs/DVDs. Other peripheral units may be present, such as a floppy-disk driver for reading/writing floppy disks, a memory card reader for reading/writing memory cards, a Universal Serial Bus (USB) adapter with one or more USB (Universal Serial Bus) ports, printers and the like. For the connection to a data communication infrastructure 290, the computer may be further equipped with a Network Interface Adapter (NIA) card 221; alternatively (or in addition), the computer may be connected to the data communication infrastructure 290 by means of a MODEM, not explicitly depicted in the drawing; in the case of a mobile phone, the connection to the data communications infrastructure 290 is achieved by means of the radio transmitter/receiver provided for the connection to the mobile telephony network.

Figure 3:
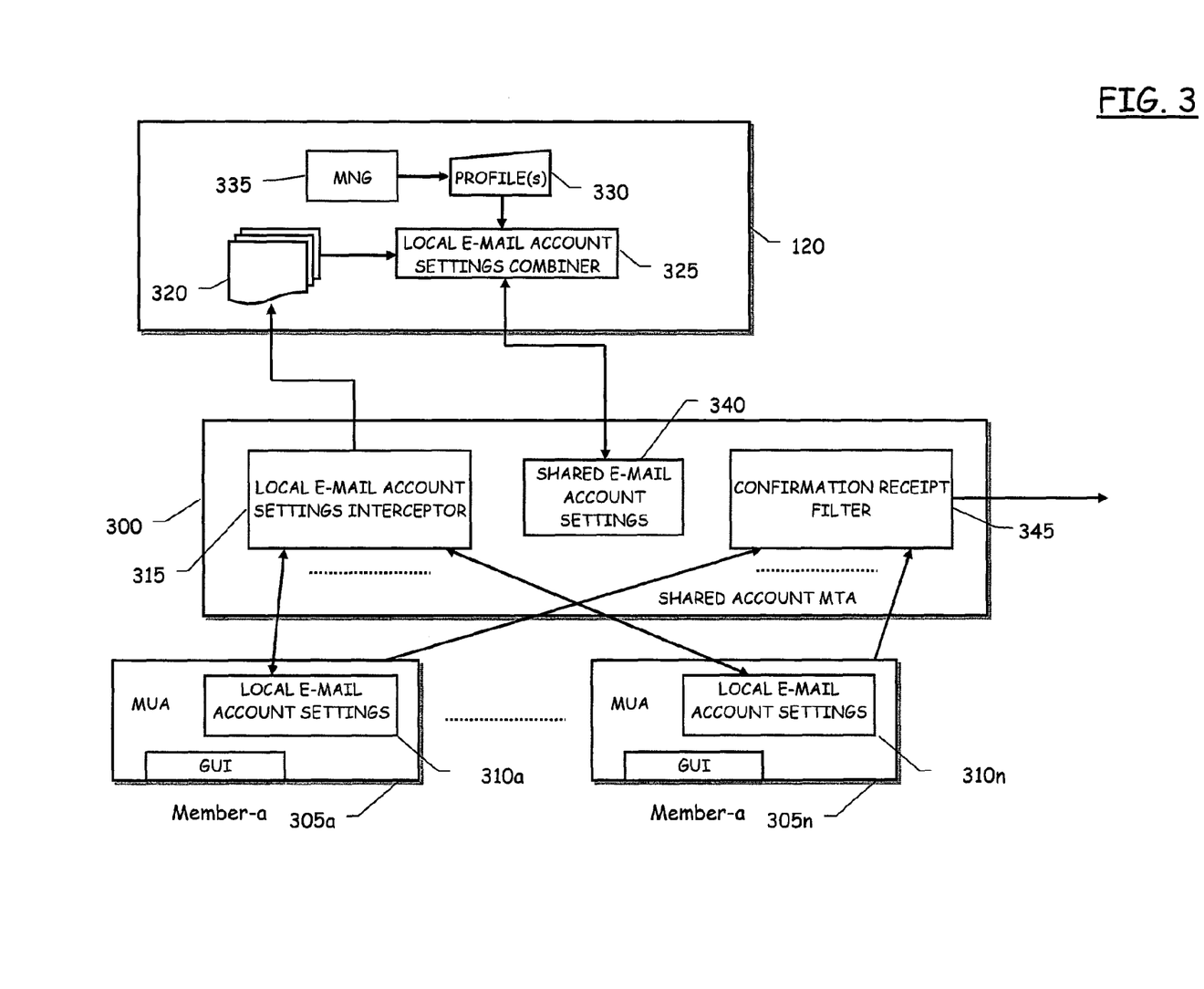
FIG. 3 schematically shows, in terms of functional blocks, the main components of a Mail Transport Agent (MTA) and of a master Mail User Agent (MUA) of a shared e-mail system according to an embodiment of the present invention.

FIG. 3 shows schematically, in terms of functional blocks that may represent software modules, hardware components or a mix thereof, the structure of the shared e-mail account MTA 300 and of the master MUA 120, according to an embodiment of the present invention, and the interaction with the MUAs 305a, ..., 305n of the co-owners of the shared e-mail account, i.e. the team members Member-a, Member-b, ..., Member-n. Each team member Member-a, Member-b, ..., Member-n can, as usual, set, through his/her MUA 305a, ..., 305n, (local) e-mail account configuration settings 310a, ..., 310n. Similarly, any member Member-a, Member-b, ..., Member-n of the can access the shared e-mail system server 110s through a web-based interface (exploiting to this purpose any of the known web browsers, resident on his/her computer 115a, 115b, ..., 115n), and set, locally at his/her location, configuration settings for the shared e-mail account.

Conventionally, whenever any of the team members modifies a setting locally, the change is applied globally to the shared e-mail account as a whole, as if that co-owner of the shared e-mail account were the only owner; this causes the enforcement of the configuration settings to be rather blind, as discussed in the foregoing.

According to an embodiment of the present invention, the MTA 300 of the shared e-mail account includes an interceptor function 315, adapted to intercept the e-mail account configuration settings set locally by any of the members Member-a, Member-b, ..., Member-n, through either the respective MUA 305a, 305b, ..., 305n or accessing the shared e-mail server 110s through a web-based interface. The interceptor function 315 interacts with the master MUA 120. In particular, the intercepted, locally-set configuration settings, which are received from the different members Member-a, Member-b, ..., Member-n and are intercepted by the interceptor function 315, are stored at the master MUA 120 in an archive 320, and they are then properly combined, aggregated by a combiner function 325 of the master MUA, based on one or more profiles 330, which can be defined by, e.g., an administrator of the shared e-mail account (through a management interface 335). The result of the combination performed by the combiner function 325 are the shared e-mail account configuration settings 340 of the shared e-mail MTA 300, which affect the operation of the MTA 300, and thus of the shared e-mail account.

In other words, according to an embodiment of the present invention, as far as the changes to the configuration settings of the shared e-mail system are concerned, the master MUA 120 is reputed by the shared e-mail MTA 300 as the only entity that is authorized to modify the MTA configuration settings, which cannot be directly affected by the changes made locally by the different co-owners of the shared e-mail account, through their MUAs or a web interface to the shared e-mail server. This allows taking into account of the existence of several different co-owners of the shared e-mail account.

Several different profiles 330 can be adopted. For example, a profile may prescribe that an auto-reply message is sent by the MTA 300 upon receipt of an e-mail message from a sender when all, or a predefined number of members out of the total number of members have locally set an auto-reply message indicating that they are unavailable.

Figure 4:
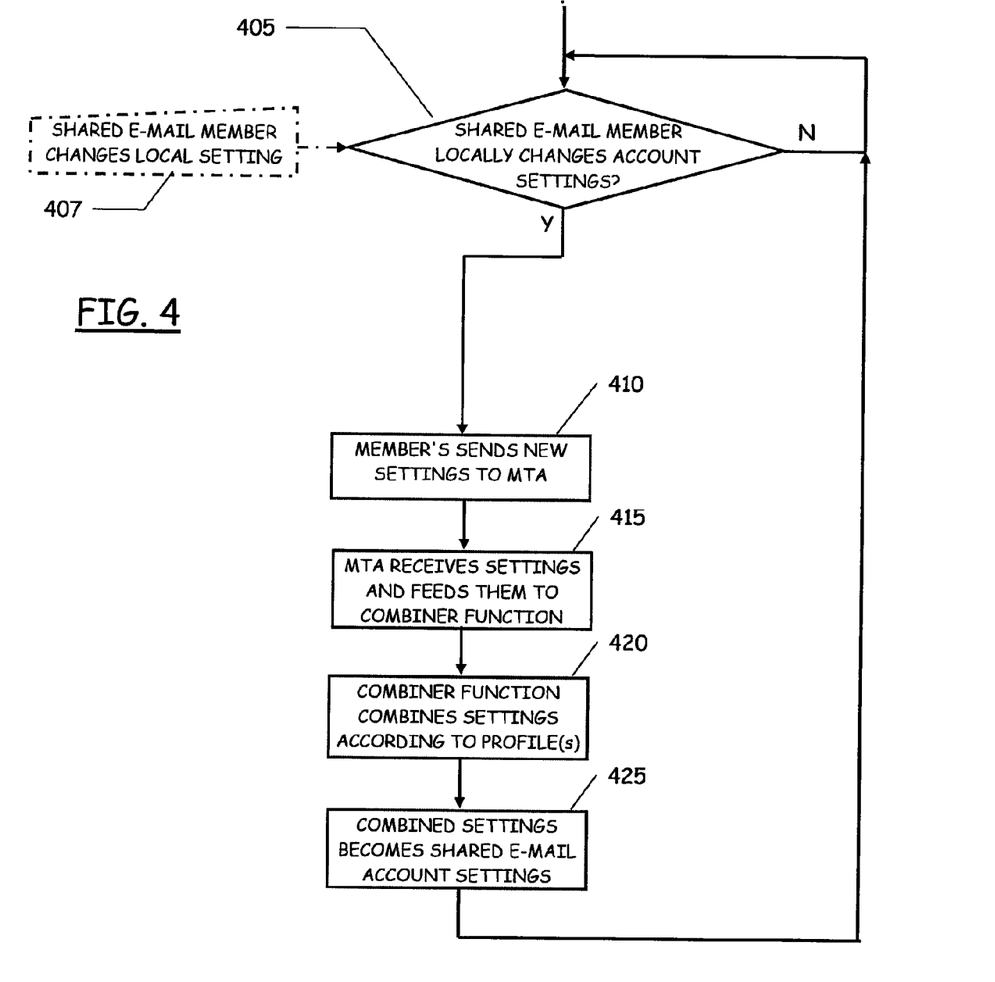
FIG. 4 is a schematic flowchart showing the main actions of a method according to an embodiment of the present invention.

The schematic flowchart of FIG. 4 shows the main actions performed by the MTA 300, in one embodiment of the present invention. As long as none of the members changes locally the shared e-mail account settings (either through the respective MUA, or accessing the shared e-mail server 110s through a web interface), nothing happens (the previous, shared e-mail account settings are retained) (decision block 405, exit branch N). When one of the members Member-a, Member-b, ..., Member-n co-owning the shared e-mail account locally (i.e., through his MUA, or accessing through a web interface the shared e-mail server exploiting a local web browser) changes the settings (action 407), that member sends the new settings to the MTA 300 (block 410). The new settings, once received at the MTA 300, are intercepted by the interceptor function 315, they are sent to the master MUA 120, which saves them in the archive 320, and then the newly received settings are fed to the combiner function 325 (block 415). The combiner function 325 combines (block 420) the new configuration settings received from the computer of one of the members Member-a, Member-b, ..., Member-n with those (possibly stored in the archive 320) set by the other members, and with the current shared e-mail account configuration settings 340, based on the profile(s) 330, thereby deriving the new, updated configuration settings 340 for the shared e-mail account (block 425).

For example, as mentioned above, a profile may prescribe that an auto-reply message is sent by the MTA 300 upon receipt of an e-mail message from a sender when all, or a predefined number of members out of the total number of members have locally set an auto-reply message indicating that they are unavailable. The auto-reply message sent by the MTA 300 may for example contain an indication of when a member of the team will be available (based on the return times specified in the settings received from the team members; for example, it may be the return time of the first team member to be back to the work, or, in case at least a predetermined number n of members is regarded as necessary to offer the service, the return time of the last of the n members to be back to work).

Also, in an embodiment of the invention, the combining function 325 may be adapted to estimate an expected time necessary to reply to an incoming message from a customer, based for example on the number of members that have set, locally to their MUAs, the auto-reply function, and thus to include, in an auto-reply message to be sent to the customer, an indication of the estimated expected time. In particular, the estimation of the expected time may be based on the extraction, performed by the combining function 325, from the auto-reply message settings set locally by the members Member-a, Member-b, . . . , Member-n, of an indication of periods of time of unavailability of the members.

The estimation of the expected time to reply to a customer message may also be based, in addition to the presence of the team members, also on other settings that the team members may input through their MUAs; for example, a team member may set different levels of productivity, based on the workload or on the daily agenda (participation to meetings and the like); this may also be done automatically by the MUA of a team member, interacting with a calendar function of the team member. The estimation of the expected time to reply to a customer message may also be exploited to highlight those messages which are to served quickly.

The Applicant has further observed that a problem of the current implementations of shared e-mail systems resides in the fact that confirmation of receipt requests that may be included in messages received from customers are managed rather blindly: any co-owner Member-a, Member-b, . . . , Member-n of the shared e-mail account, upon displaying the message through his/her MUA, when the receipt confirmation request pops-up, may send the confirmation of receipt message, and thus the original message sender receives a lot of confusing and annoying confirmation of receipt messages.

Referring back to FIG. 3, in a preferred embodiment of the present invention, the MTA 300 includes a filter function 345 which is adapted to filter out receipt confirmation messages subsequent to a first confirmation of receipt issued in respect of a certain incoming message. In particular, the filter function 345 is adapted to intercept all the messages issued by the MUAs 305*a*, . . . , 305*n* of the members Member-a, Member-b, . . . , Member-n, or at least to intercept the messages being receipt confirmation to other messages, and, based on unique message identifiers that, according to the standard, identifies any e-mail message, to recognize when a message is not the first issued confirmation of receipt: in that case, the message is discarded; in this way, the sender of the original message can receive a single confirmation of receipt, and this is believed to be far more satisfactory than receiving no confirmation of receipt, or receiving dozens of confirmation of receipts.

The implementation of the present invention has a limited impact, and merely requires a modification to the existing MTA software tools.

Although the present invention has been described by way of an embodiment, it is apparent to those skilled in the art that several modifications to the described embodiments, as well as other embodiments of the present invention are possible without departing from the scope thereof as defined in the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk-read only memory (CD-ROM), compact disk-read/write (CD-R/W) and digital versatile disk (DVD). Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. A method of managing a shared electronic mail account co-owned by at least two owners, the method comprising:
   intercepting electronic mail account configuration settings received from the at least two owners, wherein the intercepted electronic mail account configuration settings are generated local to the at least two owners;
   sending the intercepted mail account configuration settings to be saved in an archive having current electronic mail account configuration settings;
   comparing the intercepted mail account configuration settings with the current electronic mail account configuration settings;
   combining the intercepted electronic mail account configuration settings with the current electronic mail account configuration settings based on a shared electronic mail account profile so as to generate shared e-mail account configuration settings;
   estimating an expected time needed to reply to a message received at the shared electronic mail account;
   replying to the received message by sending a reply message containing an indication of the expected time, wherein the expected time needed to reply to the message received at the shared electronic mail account is determined by at least one of an indication of periods of time of unavailability of members of the shared electronic mail account, levels of productivity based on a daily agenda, and an interaction with a calendar function of a team member, and a determination of messages that are to be first served; and
   applying the shared e-mail account configuration settings so as to affect the operation of the shared electronic mail account, wherein the shared e-mail account configuration settings are based solely on the shared electronic mail account profile, inclusive of the local changes consistent with the account profile, and exclusive of local changes inconsistent with the mail account profile.

2. The method of claim 1, wherein:
the intercepting includes intercepting auto-reply message configuration settings by at least one of the at least two owners; and
the combining includes activating an auto-reply message functionality for the shared electronic mail account in case a selected number of owners have set respective auto-reply messages.

3. The method of claim 2, in which the intercepting further includes:
extracting from the auto-reply message settings by at least one of the at least two owners information related to an unavailability of the owner to attend messages received at the shared electronic mail account; and
using the extracted information in the combining.

4. The method of claim 1, further comprising:
upon receiving a message including a confirmation of receipt request, enabling sending back only the first confirmation of receipt message.

5. A system for managing a shared electronic mail account co-owned by at least two owners, the system comprising:
a shared mail transfer agent (MTA) configured to intercept electronic mail account configuration settings received from the at least two owners, wherein the intercepted electronic mail account configuration settings are generated local to the at least two owners; and
a master mail user agent (MUA) configured to receive, store in an archive having current electronic mail account configuration settings, compare and combine the intercepted electronic mail account configuration settings with the current electronic mail account configuration settings, based on a shared electronic mail account profile, so as to generate shared e-mail account configuration settings of the shared MTA;
wherein the shared e-mail account configuration settings of the shared MTA are applied by the shared MTA so as to affect the operation of the shared MTA and the shared e-mail account,
wherein the MUA is further configured to estimate an expected time needed to reply to a message received at the shared electronic mail account, and to reply to the received message by sending a reply message containing an indication of the expected time, wherein the expected time needed to reply to the message received at the shared electronic mail account is determined by at least one of an indication of periods of time of unavailability of members of the shared electronic mail account, levels of productivity based on a daily agenda, and an interaction with a calendar function of a team member, and a determination of messages that are to be first served,
wherein the shared e-mail account configuration settings are based solely on the shared electronic mail account profile, inclusive of the local changes consistent with the account profile, and exclusive of local changes inconsistent with the mail account profile.

6. The system of claim 5, wherein:
the intercepting includes intercepting auto-reply message configuration settings by at least one of the at least two owners; and
the combining includes activating an auto-reply message functionality for the shared electronic mail account in case a selected number of owners have set respective auto-reply messages.

7. The system of claim 6, wherein:
the shared MTA extracts, from the auto-reply message settings by at least one of the at least two owners, information related to an unavailability of the owner to attend messages received at the shared electronic mail account; and
the MUA uses the extracted information in the combining.

8. The system of claim 7, wherein:
the extracted information is used for estimating an expected time needed to reply to a message received at the shared electronic mail account, and
the received message is replied to by sending a reply message containing an indication of the expected time.

9. The system of claim 5, wherein:
upon receiving a message including a confirmation of receipt request, sending back only the first confirmation of receipt message is enabled.

10. A computer storage medium, comprising:
computer program code comprising computer executable instructions for causing a computer to implement a method of managing a shared electronic mail account co-owned by at least two owners, the method further comprising:
intercepting electronic mail account configuration settings received from the at least two owners, wherein the intercepted electronic mail account configuration settings are generated local to the at least two owners;
sending the intercepted mail account configuration settings to be saved in an archive having current electronic mail account configuration settings;
comparing the intercepted mail account configuration settings with the current electronic mail account configuration settings;
combining the intercepted electronic mail account configuration settings with the current electronic mail account configuration settings based on a shared electronic mail account profile so as to generate shared e-mail account configuration settings;
estimating an expected time needed to reply to a message received at the shared electronic mail account;
replying to the received message by sending a reply message containing an indication of the expected time, wherein the expected time needed to reply to the message received at the shared electronic mail account is determined by at least one of an indication of periods of time of unavailability of members of the shared electronic mail account, levels of productivity based on a daily agenda, and an interaction with a calendar function of a team member, and a determination of messages that are to be first served; and
applying the shared e-mail account configuration settings so as to affect the operation of the shared electronic mail account
wherein the shared e-mail account configuration settings are based solely on the shared electronic mail account profile, inclusive of the local changes consistent with the account profile, and exclusive of local changes inconsistent with the mail account profile.

11. The computer storage medium of claim 10, wherein:
the intercepting includes intercepting auto-reply message configuration settings by at least one of the at least two owners; and the combining includes activating an auto-reply message functionality for the shared electronic mail account in case a selected number of owners have set respective auto-reply messages.

12. The computer storage medium of claim 11, in which the intercepting further includes:
    extracting from the auto-reply message settings by at least one of the at least two owners information related to an unavailability of the owner to attend messages received at the shared electronic mail account; and
    using the extracted information in the combining.

13. The computer storage medium of claim 12, wherein the method further comprises:
    using the extracted information for estimating an expected time needed to reply to a message received at the shared electronic mail account, and
    replying to the received message sending a reply message containing an indication of the expected time.

14. The computer storage medium of claim 10, wherein the method further comprises:
    upon receiving a message including a confirmation of receipt request, enabling sending back only the first confirmation of receipt message.

* * * * *